J. B. KNUDSEN.

COIL SPRING.

APPLICATION FILED FEB. 27, 1917.

Reissued Apr. 17, 1917. 14,287.

Witnesses

~~L. B. Barrett~~

N. P. Haley

Inventor

Jacob B. Knudsen

By Jone, Addington, Ames & Aubell

Attys.

THE NORRIS PETERS CO., PHOTO-LITHO., WASHINGTON, D. C.

UNITED STATES PATENT OFFICE.

JACOB B. KNUDSEN, OF CHICAGO, ILLINOIS, ASSIGNOR OF ONE-HALF TO FRANCIS H. QUAIL, OF CHICAGO, ILLINOIS.

COIL-SPRING.

14,287. Specification of Reissued Letters Patent. Reissued Apr. 17, 1917.

Original No. 843,827, dated February 12, 1907, Serial No. 316,450, filed May 12, 1906. Application for reissue filed February 27, 1917. Serial No. 151,367.

*To all whom it may concern:*

Be it known that I, JACOB B. KNUDSEN, a citizen of the United States, residing at Chicago, in the county of Cook and State of Illinois, have invented certain new and useful Improvements in Coil-Springs, of which the following is a specification.

This invention relates to coil-springs, and one of the particular objects of the invention is to provide a coil-spring that will not be de-tempered by long exposure to heat, that will possess sufficient tension or resiliency for many purposes, that can be cheaply manufactured, and that may have the ends of its outer coils merge with the adjacent coils or with a flange-ring, as shown in the drawings.

My spring is especially adapted for use in steam or hot-water valves, and when so used retains its efficiency and resiliency indefinitely, though springs made by the usual methods soon lose their resiliency when subjected to this test.

It is well known that coil-springs as commonly made lose their temper when subjected to a certain degree of heat, and hence become so impaired as to be practically useless until retempered. My coil-springs are without "temper," as the term is commonly used, and yet possess and retain constantly their resiliency though subjected for a long time to a high degree of either moist or dry heat. While the resilient quality of springs of my invention is more limited than those of the usual kind, they have and constantly retain sufficient "life" and resiliency to render them efficient in various positions and under a wide range of conditions.

In the accompanying drawings I have illustrated one form of a coil-spring embodying my invention. In said drawings—

Figure 1:
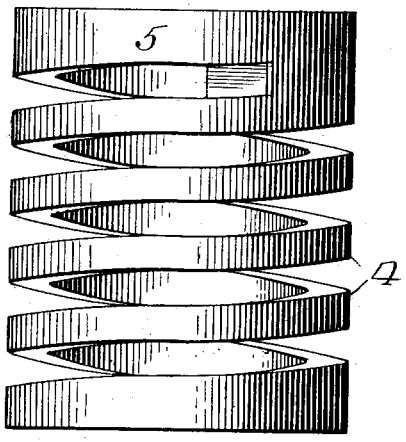
Figure 1 shows the spring in elevation.
Figure 2:
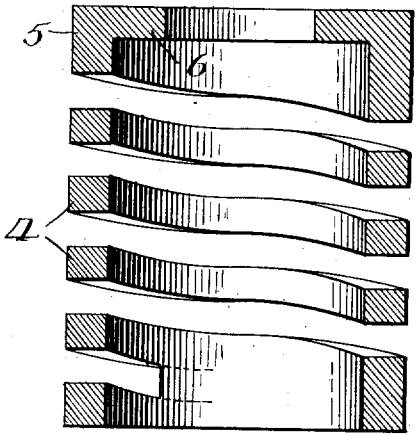
Fig. 2 shows it in vertical section.
Figure 3:
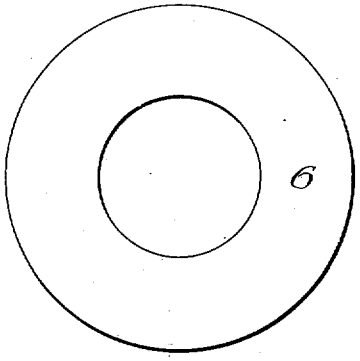
Fig. 3 is a top plan view.

Referring to the drawings in detail, it will be seen that the spring is made up of a plurality of coils 4, each of which is rectangular in cross-section, and that the upper coil merges with an annular ring 5, formed with an inwardly-extending flange 6, which may provide a seat or bearing for some part intended for use with the spring. If made in the ordinary way, it would be quite difficult, if not impossible, to form this wide flat ring integral with the spring-coils. The customary method of getting similar results is to provide a separate ring and secure it to the spring. The lowermost coil of the spring shown merges with the coil above it, forming a closed spiral at its end. Were this spring made from a steel bar bent to the shape shown, the free end of the bar would have to be welded to the adjacent coil,—a more or less expensive operation. I do not wish, however, to confine myself to the particular form of spring shown and described, since it may be made with free ends, as in ordinary springs, or otherwise, as desired, and still possess very valuable advantages not possessed by springs of the usual character and made by the usual methods.

My invention involves making a spring in the form desired in one operation by casting it from a suitable two-piece pattern in a moldbox with a sand core in the same manner that any other cylindrical casting would be produced. The molten metal is preferably iron or steel, or, so far as I now know, might be certain other metals having sufficient hardness. I have made springs by this casting method from iron and subjected them to severe and prolonged tests and find that they maintain their efficiency under conditions as to heat, pressure, and torsional strain that would render useless the ordinary tempered springs of commerce.

Having thus described my invention, what I claim is—

1. As a new article of manufacture, a cast-iron coil-spring having its convolutions cast in spiral form.

2. As a new article of manufacture, a cast-metal coil-spring having its convolutions cast in spiral form.

3. As a new article of manufacture, a coil-spring composed of cast metal and having its respective ends integral with the next adjacent coil and having its convolutions cast in spiral form.

4. As a new article of manufacture, a coil-spring composed of cast metal having the annular flange formed integral with the end coil and having its convolutions cast in spiral form.

In testimony whereof I have affixed my signature to this specification in the presence of two subscribing witnesses.

JACOB B. KNUDSEN.

Witnesses:

O. CZEKALA,

W. P. HAHN.

Copies of this patent may be obtained for five cents each, by addressing the "Commissioner of Patents, Washington, D. C."